Jan. 7, 1941.  G. L. BROWNELL  2,227,699

FLIER FOR TWISTING MACHINES

Filed May 5, 1939

Inventor:
George L. Brownell
By Owen N. Kennedy
Attorney

Patented Jan. 7, 1941

2,227,699

UNITED STATES PATENT OFFICE 2,227,699

FLIER FOR TWISTING MACHINES

George L. Brownell, Worcester, Mass., assignor to G. L. Brownell, Inc., Worcester, Mass., a corporation of Massachusetts Application May 5, 1939, Serial No. 271,987

3 Claims. (Cl. 57—68)

The present invention relates to twisting machines, wherein filamentary material, in twisted form, is wound on a spool by the rotation of a flier about an axis coinciding with that of the spool. There are two types of such machines, in one of which the receiving spool remains in the same position in the flier, while the distributing guide traverses back and forth along the axis of the spool; in the other type the distributing guide remains stationary in the flier, while the receiving spool traverses back and forth along its axis, and this latter type is described in the present application.

Such fliers, as heretofore constructed, have grooved cylindrical, or conical shaped drums, or haulers on opposite sides of their axes of rotation to which the axes of the haulers are parallel, and while revolving with the fliers, the haulers are given a rotation, in the same direction, on their own axes. The successive grooves on the straight or tapered haulers, are increased in diameter, according to the amount of elongation or stretch to be given to the twisted material, and while these haulers, with their driving elements, are made as light in weight as practicable, at high flier speeds their centrifugal pull is a factor to be reckoned with. In operation, the material passes into the flier, along its axis of rotation, and around a guide, or guide-pulley, and then around the haulers, back and forth in their grooves, which haulers by their own rotation, draw in the cord twisted by the revolving flier, stretch it, and pass it on to the mechanism winding it onto the spools.

For twisting materials not susceptible of more than normal stretching and rather adversely affected by alternately repeated flexures due to windings around the haulers, the improved flier of the present invention replaces the hauling, flexing, and stretching drums, with a single draft-applying element in the form of a winch, thereby providing a very much simpler, less expensive flier, capable of greater speed, less flexure of the material, and with entire elimination of centrifugal strains, all as hereinafter described. The above and other advantageous features of the invention will hereinafter more fully appear from the following description, with reference to the accompanying drawing, in which:

Like reference characters refer to like parts in the different figures.

Figures 1, 2, 3:
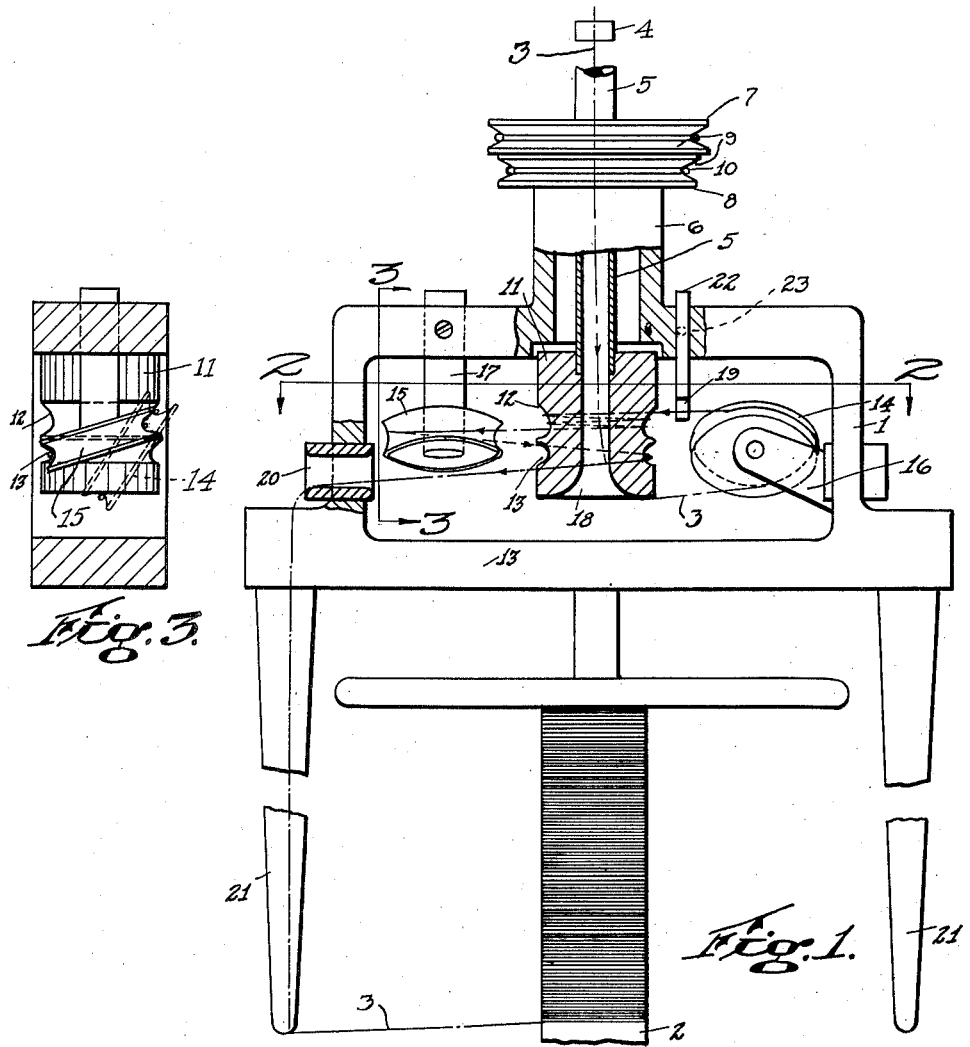
Fig. 1 is a view partially in section, and partially in side elevation, of a flier construction embodying the invention.
Fig. 2 is a horizontal sectional view, along the line 2—2 of Fig. 1, looking in the direction of the arrows.
Fig. 3 is a fragmentary sectional view along the line 3—3 of Fig. 1, looking in the direction of the arrows.

Referring to the drawing, a flier head 1 is mounted to rotate about an axis coinciding with that of a spool 2, on which twisted filamentary material 3 is to be wound, only a portion of the spool being shown. The material 3 leads from a point of twisting, indicated at 4, downwardly through a hollow spindle 5 rotatable within a sleeve 6, forming part of the flier head 1. The spindle 5 and the flier sleeve 6 are provided with pulleys 7 and 8 having grooves 9 of different diameters, whereby the spindle and the flier may be driven respectively, at different speeds, by an endless round belt 10 passing around pulley 8, an idler-tightener, not shown, and pulley 7.

The spindle 5 is hollow for the passage therethrough of the material 3, and carries at its lower end, within the flier, a draft-applying element in the form of a winch 11, having peripheral grooves 12 and 13. A pair of grooved guide pulleys 14 and 15 are mounted on holders 16 and 17, respectively, at equal distances from the spindle axis, with the pulleys being free to rotate about axes inclined with respect to the spindle axis. The material 3 to be twisted, passes downwardly through the winch 11, from which it emerges through a flared opening 18, to pass around the pulley 14. The inclination of the axis of the pulley 14 is such as to deliver the material tangentially to the upper winch groove 12, see Fig. 2, and a guide pin 19 insures that the material will enter the upper portion of the groove 12.

After passing as many times as desired around the winch 11 within the groove 12, the material leaves said groove, from which it passes around the other pulley 15. From the pulley 15, the material then passes once around the lower groove 13 of the winch, from which it leads through a guide 20 downwardly into a laying arm 21 of the flier, for winding on the spool 2. The inclination of the axis of the pulley 15 is such that the upper side of the pulley as viewed in Fig. 3, is in alinement with the upper winch groove 12, while the lower side of the pulley is in alinement with the lower winch groove 13. Consequently, the material readily leaves the groove 12 and enters the groove 13, without any side pull. By making the groove 13 of larger diameter than the groove 12, the material can be certainly and positively drawn from the winch and even stretched, if desired.

When the flier 1 and spindle 5 are simultaneously driven through the pulleys 7 and 8, the material 3 is drawn through the spindle and around the pulley 14 by the draft of the winch 11, while at the same time, rotation of the flier 1 causes the material to be twisted before it is wound on the spool 2.

While, as shown in Fig. 1, the direction of rotation of the flier 1 is such as to cause the material 3 to be wound on the spool 2 by the left-hand laying arm 21, the direction of rotation of the flier can be reversed, if desired, to cause the right-hand laying arm to wind the material in the opposite direction on the spool. In that event, the holders 16 and 17 carrying the pulleys 14 and 15 are reversed in the flier, and the winch 11 is also driven in the opposite direction. Should it be desired to employ a winch 11 having a groove 12 of larger or smaller diameter than as shown, the guide pin 19 can be turned about a vertical shank 22 to position an upwardly bent end portion 19a farther away from, or nearer to, the axis of the winch, so as to properly guide the material into the groove 12. A set screw 23 is provided to hold the shank 22 of the pin 19 in its adjusted position.

From the foregoing, it is apparent that by the present invention, there is provided an improved and simplified flier, providing a winch or draft-applying element rotatable about the flier axis, so that the material being twisted will be subjected to a uniformly applied draft, with a minimum of flexing, and with elimination of the detrimental effects of centrifugal force, at high flier speeds.

I claim:

1. A flier construction for twisting machines comprising a rotatably driven body, a rotatably driven spindle extending coaxially through said body, a winch member providing spaced peripheral grooves of different size and mounted at one end of said spindle, and pulleys loosely mounted on the flier body at opposite sides of its axis for guiding material to be twisted first around one winch groove for imparting a draft to the material, and then around the other groove for drawing the material from the winch with incidental stretching.

2. A flier construction for twisting machines, comprising a rotatably driven body, a rotatably driven spindle extending coaxially through said body, a winch member providing peripheral grooves of different diameters mounted at one end of said spindle, and pulleys loosely mounted on the flier body at opposite sides of its axis for guiding material to be twisted first around the winch groove of smaller diameter, for imparting a draft to the material, and then around the winch groove of larger diameter, for drawing the material from the winch, with elongation thereof.

3. A flier construction for twisting machines, comprising a rotatably driven flier body, a rotatably driven spindle coaxial with said flier body and terminating in a grooved winch member surrounding an opening extending longitudinally of the spindle, and pulleys mounted on said body for free rotation about axes inclined with respect to the flier axis, with one of said pulleys serving to guide the material to be twisted from said spindle opening to one of said winch grooves, and the other of said pulleys serving to transfer said material from one winch groove to another.

GEORGE L. BROWNELL.